May 7, 1963
E. L. HARRIS
3,088,348
TIRE AND TUBE REPAIR FIXTURE
Filed May 23, 1960
2 Sheets-Sheet 1
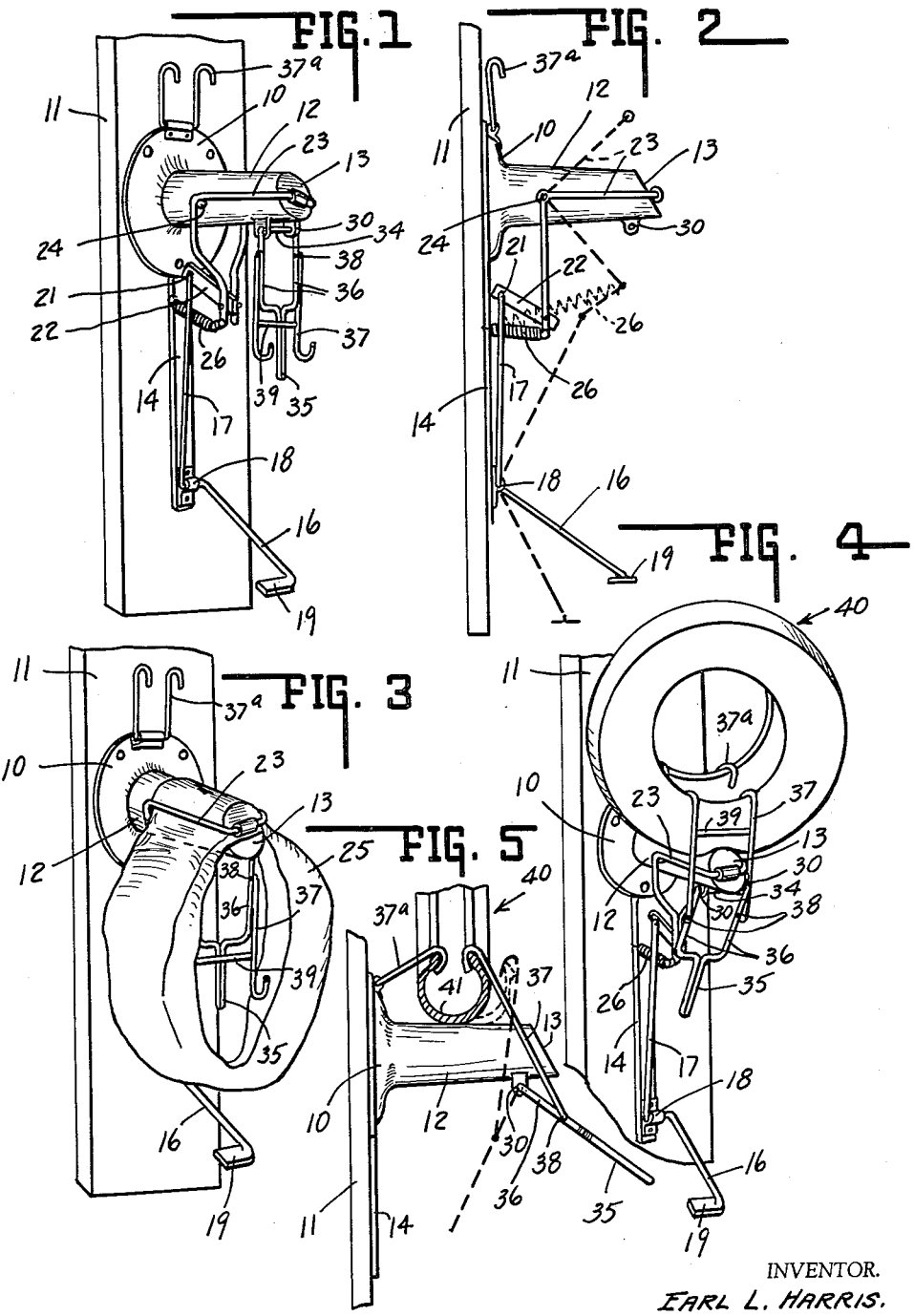
INVENTOR.
EARL L. HARRIS.
BY
Lockwood, Galt, Woodard & Smith.
ATTORNEYS.

May 7, 1963 E. L. HARRIS 3,088,348
TIRE AND TUBE REPAIR FIXTURE
Filed May 23, 1960 2 Sheets-Sheet 2

INVENTOR.
EARL L. HARRIS
BY
Lockwood, Woodard, Smith & Weikart
ATTORNEYS

United States Patent Office
3,088,348
Patented May 7, 1963

3,088,348
TIRE AND TUBE REPAIR FIXTURE
Earl L. Harris, Rte. 1, Spencer, Ind.
Filed May 23, 1960, Ser. No. 32,505
3 Claims. (Cl. 81—15.2)

This invention relates generally to a releasable fixture or holder and in particular to a fixture adapted to properly position and secure for repair either a tubeless tire or a conventional tire inner tube.

The present application is a continuation-in-part of my application for Tire and Tube Repair Fixture, filed August 4, 1958, S.N. 752,970.

With the increasing use of tubeless tires on modern automobiles a need has arisen for a procedure and apparatus for repairing small cuts or punctures in such tires. One conventional procedure for repairing punctures in tubeless tires involves coring out the tire at the puncture and inserting a plug in the opening thereby formed. This often results in severing of the tire cords adjacent the puncture opening and in consequent weakening of the tire structure. Sealing small puncture openings by abrading the adjacent inner surface of the tire and applying a sealing patch is made difficult, in the case of tubeless tires, because of the inaccessibility of the inner surface of the tire.

In repairing the inner tubes of conventional tube-type tires it is important that a fixture or holder be provided for positively clamping the tube in conveniently accessible position so that the surface adjacent any puncture or cut may be abraded or otherwise prepared for receiving a sealing patch. Devices serving this function are not unknown in the prior art, however, they leave much to be desired in the positiveness of their clamping action and in their ease of operation.

It is the primary object of the present invention, therefore, to provide a fixture or holder which may be alternately operated to positively clamp either a tubeless tire or a conventional tire inner tube in proper position for repair.

A further object of the present invention is to provide a releasable fixture for repair positioning of a tire inner tube which utilizes a linkage whereby the tube is positively clamped and held in position and which may be released by means of a conveniently accessible foot pedal.

A further object of the present invention is to provide a fixture for repair positioning of a tubeless tire which utilizes a linkage having an over-center action to positively clamp and spread the tire so that its inner surface is accessible.

A further object of the present invention is to provide a fixture or holder for clamping either a tubeless tire or a conventional tire inner tube in repair position, the fixture structure being characterized by ease in mounting and use.

The full nature of the invention will be understood from the accompanying drawings and the following description and claims:

FIG. 1 is a perspective view of a fixture embodying the present invention.

FIG. 2 is a schematic, side view of the inner tube clamping mechanism of the fixture.

FIG. 3 is a perspective view of the fixture with an inner tube clamped in place thereon.

FIG. 4 is a perspective view of the fixture with a tubeless tire supported thereon.

FIG. 5 is a schematic, side view of the fixture illustrating the operation of the tubeless tire supporting portion of the fixture.

Figure 6:
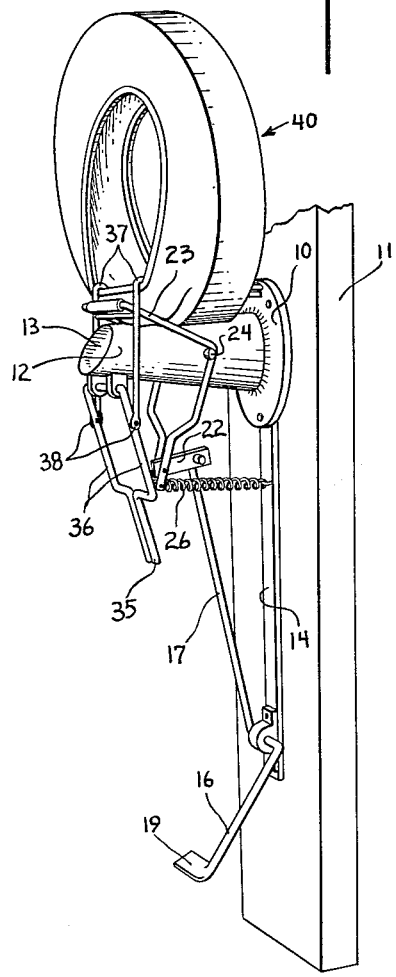
FIG. 6 is a perspective view of the fixture illustrating further operation of the tubeless tire supporting fixture.

Referring initially to FIGS. 1, 2 and 3, the fixture includes a flanged base plate 10 having a frusto-conical configuration and adapted to be mounted upon a vertical surface such as that provided by a support post, wall or the like, indicated at 11. A generally cylindrical anvil 12 extends horizontally from the base plate and has its outer end formed so as to incline downwardly and outwardly with relation to the base plate as indicated at 13. A depending bar 14 is rigidly secured, by welding or other suitable means, to the lower margin of the base plate. A generally V-shaped member having a lower leg 16 and an upper leg 17 is pivotally supported at 18 on the bar 14. The free end of the leg 16 is formed to provide a suitable foot pedal 19.

The upper end of the leg 17 is pivotally attached at 21 to a link 22. The outer end of the link 22 pivotally supports the adjacent free ends of the generally U-shaped clamping member 23. The clamping member is also pivotally supported at 24 on the anvil. A tension spring 26 extends between the bar 14 and the pivotal supporting junction between the clamping member and the link 22.

The tube clamping portion of the fixture will now be described with reference to FIGS. 2 and 3. As may be seen in FIG. 2, the spring 26 retains the foot pedal and clamping member in their solid line positions, the transverse portion of the clamping member being held tightly against the inclined outer end of the anvil. By depressing the foot pedal the legs 16 and 17 will be moved to their broken line positions of FIG. 2 against the force exerted by the tension spring. By means of the displacement of the link 22 the clamping member 23 will be pivoted about its support 24 into its broken line position. With the foot pedal held in its depressed position an inner tube, indicated at 25 in FIG. 3, may be positioned over the anvil as shown in FIG. 3, with the inner tube area requiring processing being positioned over the upper convex surface of the anvil. Subsequent release of the foot pedal thereupon permits the linkage to return to its solid line position of FIG. 2, the tension spring thereby pressing the clamping member over the inner tube and positively holding it on the anvil. The tube may then be processed and repaired with release of the tube from the anvil being accomplished by again depressing the foot pedal 19.

The tubeless tire supporting portion of the fixture will now be described with reference to FIGS. 1, 4 and 5. Spaced, depending ears 30 rigidly secured to the underside of the anvil pivotally support the transverse portion 34 of a handle member 35 having spaced legs 36. A pair of tire bead-engaging hooks 37 are pivotally supported at 38 on the legs 36, the pivotal supports for the hooks being located intermediate the ends of the legs 36. A cross brace 39 extends between the hooks so that they may be pivotally moved in unison. A second pair of tire bead-engaging hooks 37a are pivotally supported at the upper margin of the base plate 10.

In operation, a tubeless tire indicated at 40 may be supported transversely on the upper surface of the anvil. The tire is placed on the anvil with its puncture area, or the area otherwise requiring repair, overlying the anvil. The hooks 37a may then be moved manually so as to engage the adjacent bead area of the tire. By moving the handle member 35 upwardly from its position of FIG. 1, the hooks 37 may be moved into engagement with the bead area of the tire remote from the base plate. Engagement of the handle member with the cross brace 39 coordinates the movement of the hooks 37 with the movement of the handle member. With the hooks 37 engaged with the bead area of the tire, the handle member 35 will rest in its solid line position of FIG. 5. Subsequent clockwise movement (as viewed in FIG. 5) of the handle member will displace the pivotal mounting 38 of the hooks 37 from a position outboard of the pivotal support of the handle member to a position inboard thereof, these positions being illustrated in solid and broken lines respectively in FIG. 5. In moving the hooks 37 over center, the bead areas of the tire will be separated with the resilience of the tire structure serving to hold the handle member in its broken line position. With the bead areas of the tire spread apart, the inner surface of the tire, indicated at 41, will be exposed for repair processing. The tube clamping structure also aids in the tubeless tire repairing function in that, with the tire bead areas separated as in FIG. 4, depressing foot pedal 19 raises the member 23 to its broken line position of FIG. 2 whereby the member 23 engages the outer face of the tire and distorts it upwardly. This action of member 23 serves to flatten and raise the sidewall area of the tire, thus making the inner surface more accessible for inspection and repair. FIG. 6 shows the device in this position.

From the foregoing, it will be evident that the fixture of the present invention includes components which may be utilized to support either a tubeless tire or a conventional inner tube in position for repair or other processing. The structures utilized in performing both of these functions is characterized by positive action and ease of operation.

Although various modifications may occur to others skilled in the art, the scope of the present invention is to be limited only by the appending claims.

The invention claimed is:

1. A fixture for supporting an inner tube in repair position, said fixture comprising a support member including a flanged base plate adapted to be mounted on a vertical support surface, a generally cylindrical anvil extending horizontally from said base plate and having an outwardly and downwardly inclined endface, an elongated member rigidly secured to said base plate and depending therefrom, a generally V-shaped element pivotally supported at its apex on said elongated member, the lower leg of said element carrying a foot pedal at its free end, a generally U-shaped clamping member pivotally supported on said anvil at points intermediate the ends of its legs, the free ends of the legs of said clamping member being formed to depend below said anvil, means pivotally joining the upper leg of said V-shaped member and the depending ends of said clamping member, and spring means adapted to urge said U-shaped member into a clamping position with relation to said anvil wherein the transverse section of the U-shaped member overlies the inclined anvil end, depression of said foot pedal to rock said V-shaped member about its pivotal support thereby serving to move said clamping member out of said clamping position to permit insertion of an inner tube on said anvil, release of said foot pedal permitting said spring means to move said clamping member into said clamping position.

2. A fixture for supporting an inner tube in repair position, said fixture comprising a support member including a base plate adapted to be mounted on a vertical support surface, an anvil having a convex upper surface extending horizontally from said base plate and having an outwardly and downwardly inclined endface, an elongated member rigidly secured to said base plate and depending therefrom, a generally V-shaped element pivotally supported at its apex on said elongated member, the lower leg of said element carrying a foot pedal at its free end, a generally U-shaped clamping member pivotally supported on said anvil at points intermediate the ends of its legs, the free ends of the legs of said clamping member being formed to depend below said anvil, means pivotally joining the upper leg of said V-shaped member and the depending ends of said clamping member, and spring means adapted to urge said U-shaped member into a clamping position with relation to said anvil wherein the transverse section of the U-shaped member overlies the inclined anvil end, depression of said foot pedal to rock said V-shaped member about its pivotal support thereby serving to move said clamping member out of said clamping position to permit insertion of an inner tube on said anvil, release of said foot pedal permitting said spring means to move said clamping member into said clamping position.

3. A fixture for supporting an inner tube in repair position, said fixture comprising a support member including a base plate adapted to be mounted on a vertical support surface, an anvil having a convex upper surface extending horizontally from said base plate and having an outwardly and downwardly inclined endface, a generally V-shaped element pivotally supported at its apex below said base plate, the lower leg of said element carrying a foot pedal at its free end, a generally U-shaped clamping member pivotally supported on said anvil at points intermediate the ends of its legs, the free ends of the legs of said clamping member being formed to depend below said anvil, means pivotally joining the upper leg of said V-shaped member and the depending ends of said clamping member, and spring means adapted to urge said U-shaped member into a clamping position with relation to said anvil wherein the transverse section of the U-shaped member overlies the inclined anvil end, depression of said foot pedal to rock said V-shaped member about its pivotal support thereby serving to move said clamping member out of said clamping position to permit insertion of an inner tube on said anvil, release of said foot pedal permitting said spring means to move said clamping member into said clamping position.

References Cited in the file of this patent

UNITED STATES PATENTS

| | | |
|---|---|---|
| 1,595,883 | Simpson | Aug. 10, 1926 |
| 1,638,997 | Hopkins | Aug. 16, 1927 |
| 1,823,545 | Johnson | Sept. 15, 1931 |
| 2,057,973 | Plank | Oct. 20, 1936 |
| 2,384,803 | Anderson | Sept. 18, 1945 |
| 2,525,114 | Branick | Oct. 10, 1950 |
| 2,631,817 | Trunnell | Mar. 17, 1953 |